US008079845B2

(12) United States Patent
Nowak et al.

(10) Patent No.: US 8,079,845 B2
(45) Date of Patent: Dec. 20, 2011

(54) PROCESSES FOR OPERATING A UTILITY BOILER AND METHODS THEREFOR

(75) Inventors: Ken Nowak, Ridgefield, CT (US); Rick Nowak, Wallingford, CT (US); Chuck Noeding, New Milford, CT (US); Mark Pastore, Suffern, NY (US)

(73) Assignee: Environmental Energy Services, Inc., Sandy Hook, CT (US)

( * ) Notice: Subject to any disclaimer, the term of this patent is extended or adjusted under 35 U.S.C. 154(b) by 1333 days.

(21) Appl. No.: 11/311,069

(22) Filed: Dec. 19, 2005

(65) Prior Publication Data

US 2006/0257799 A1 Nov. 16, 2006

Related U.S. Application Data

(60) Provisional application No. 60/679,391, filed on May 10, 2005.

(51) Int. Cl.
*F23D 1/00* (2006.01)
*F23J 3/00* (2006.01)

(52) U.S. Cl. .......... 431/4; 431/3

(58) Field of Classification Search .......... 431/3, 4; 110/345
See application file for complete search history.

(56) References Cited

U.S. PATENT DOCUMENTS 2,800,172 A * 7/1957 Ely et al. .......... 431/4
3,837,820 A * 9/1974 Kukin .......... 431/2
3,979,191 A * 9/1976 Furuta et al. .......... 95/199
4,202,671 A * 5/1980 Diehl et al. .......... 44/363
4,235,585 A * 11/1980 Anderson .......... 431/3
4,287,090 A 9/1981 Pfefferle .......... 252/428
4,331,638 A * 5/1982 Michelfelder .......... 423/240 R
4,423,702 A * 1/1984 Ashworth et al. .......... 122/5
4,440,100 A * 4/1984 Michelfelder et al. .......... 110/343
4,469,033 A 9/1984 Michelfelder et al. .......... 110/344
4,488,866 A * 12/1984 Schirmer et al. .......... 431/4
4,503,785 A 3/1985 Scocca .......... 110/342
4,528,918 A 7/1985 Sato et al. .......... 110/347
4,644,879 A * 2/1987 Grethe et al. .......... 110/343
4,793,268 A 12/1988 Kukin et al. .......... 110/343
4,808,108 A 2/1989 Tiggesbäumker et al. .......... 432/14
4,842,617 A * 6/1989 Kukin .......... 44/320
4,886,519 A * 12/1989 Hayes et al. .......... 44/301
4,889,614 A 12/1989 Forester .......... 208/48
4,940,010 A 7/1990 Kubin et al. .......... 110/223

(Continued)

FOREIGN PATENT DOCUMENTS

DE 25 04 391 * 8/1976

(Continued)

*Primary Examiner* — Carl Price

(74) *Attorney, Agent, or Firm* — Ohlandt, Greeley, Ruggiero & Perle, LLP

(57) ABSTRACT

There is a process for operating a utility boiler. The process has the following steps: a) continuously adding one or more slag control agents, one or more oxygen-generating agents, and a fuel oil to a furnace of the utility boiler; b) providing air to the furnace; c) burning the fuel oil to generate heat and an exhaust gas; d) periodically or continuously varying the dosage rates of the one or more slag control agents and/or the one or more oxygen-generating agents to maintain to substantially maintain one or more emissions variables in the exhaust gas within pre-determined limits. There is also a method for reducing emissions from a utility boiler and a method for reducing slag deposits within a utility boiler.

15 Claims, 1 Drawing Sheet

U.S. PATENT DOCUMENTS

| | | | | | |
|---|---|---|---|---|---|
| 4,987,839 | A | | 1/1991 | Krigmont et al. | 110/216 |
| 5,029,535 | A | | 7/1991 | Krigmont et al. | 110/345 |
| 5,048,431 | A | * | 9/1991 | Landreth et al. | 110/343 |
| 5,092,254 | A | | 3/1992 | Kubin et al. | 110/233 |
| 5,103,742 | A | | 4/1992 | Valentino | 110/215 |
| 5,139,588 | A | * | 8/1992 | Poole | 149/61 |
| 5,263,848 | A | * | 11/1993 | Gregoli et al. | 431/4 |
| 5,277,135 | A | | 1/1994 | Dubin et al. | 110/345 |
| 5,353,722 | A | | 10/1994 | Vassiliou et al. | 110/346 |
| 5,487,762 | A | * | 1/1996 | Sinha | 44/363 |
| 5,503,089 | A | | 4/1996 | Frontini et al. | 110/185 |
| 5,520,123 | A | | 5/1996 | Chappell et al. | 110/188 |
| 5,591,249 | A | | 1/1997 | Hankins | 95/6 |
| 5,645,805 | A | * | 7/1997 | Oehr et al. | 423/239.1 |
| 5,740,745 | A | | 4/1998 | Smyrniotis et al. | 110/343 |
| 5,785,936 | A | * | 7/1998 | Levendis | 423/210 |
| 5,894,806 | A | | 4/1999 | Smyrniotis et al. | 110/343 |
| 6,206,685 | B1 | * | 3/2001 | Zamansky et al. | 431/4 |
| 6,722,295 | B2 | * | 4/2004 | Zauderer | 110/345 |

FOREIGN PATENT DOCUMENTS

| | | | | |
|---|---|---|---|---|
| DE | 33 17504 | | * | 11/1984 |
| DE | 37 34 352 | | * | 4/1989 |
| DE | 19630742 | | * | 2/1998 |
| EP | 275842 | | * | 7/1988 |
| EP | 275842 | A1 | * | 7/1988 |
| JP | 54-30679 | | * | 3/1979 |
| JP | 59-162927 | | * | 9/1984 |
| JP | 09-157662 | | * | 6/1997 |
| JP | 2000070669 | A | * | 3/2000 |
| JP | 2000-249288 | | * | 9/2000 |
| JP | 2000-297915 | | * | 10/2000 |
| JP | 2000297915 | A | * | 10/2000 |
| JP | 2002177738 | A | * | 6/2002 |
| WO | WO 8607602 | A1 | * | 12/1986 |

* cited by examiner

PROCESSES FOR OPERATING A UTILITY BOILER AND METHODS THEREFOR

CROSS-REFERENCE TO A RELATED APPLICATION

The present application claims priority from U.S. Provisional Application No. 60/679,391, filed May 10, 2005. U.S. Provisional Application No. 60/679,391 is hereby incorporated by reference.

BACKGROUND OF THE INVENTION

1. Field of the Invention

The present invention relates to processes for operating a utility boiler having reduced emissions in the exhaust, minimized/reduced air flow, and reduced slag deposition within. The present invention also relates to methods for reducing emissions from, minimizing air flow into, and reducing slag deposition within a utility boiler.

2. Description of the Related Art

Utility boilers or furnaces are employed in industry for generation of heat, production of steam, and generation of electricity utilizing steam. Utility boilers typically have a furnace therein where a fuel fuel, such as residual oil or #6 fuel oil, is oxidized or burned to generate heat. Along with generating heat, utility boilers will generate or evolve an exhaust gas that will contain carbon dioxide (product of oxidation of fuel oil), residual oxygen (unreacted), inert air components, i.e., nitrogen and argon, and emissions, such as sulfur-based and nitrogen-based compounds. Exhaust gas is typically treated and then vented to the atmosphere.

A problem with operating utility boilers that burn fuel oil is sulfur-based emissions. Sulfur-based emissions result from the oxidation of sulfur impurities in fuel oil. Sulfur-based emissions primarily take the form of sulfur dioxide ($SO_2$), sulfur trioxide ($SO_3$), and sulfuric acid ($H_2SO_4$). Sulfur dioxide is the primary oxidation product. Sulfur trioxide occurs primarily from the catalytic oxidation of sulfur dioxide by vanadium compounds present in the fuel oil. Free sulfur trioxide in an exhaust gas imparts an undesirable opaque appearance (a blue haze or trailing plume) to the gas when vented to the atmosphere. Sulfur trioxide can also condense to form sulfuric acid. Free sulfuric acid can cause corrosion of process surfaces in utility boilers as well as acid rain in the atmosphere.

Another problem with operating utility boilers is the presence of vanadium in the fuel oil. Vanadium is commonly employed as a catalyst in the cracking and/or refinement of crude oil and ends up concentrated in the residual oil during the refining process. Vanadium oxidizes during the combustion process to form vanadium pentoxide and related compounds, such as sodium vanadium pentoxide, which are highly corrosive to the process surfaces within the utility boiler. High levels of corrosion reduce the operational life of the utility boiler and associated process equipment. Vanadium pentoxide has the negative effect of catalyzing, and, thus, increasing the conversion of sulfur dioxide to sulfur trioxide, which increases opacity of exhaust gas and increases formation of sulfuric acid.

Another problem with operating utility boilers that burn fuel oil is slag deposition on process surfaces within the utility boiler, including the furnace. Slag deposition can take the form of one or more layers caked/baked onto process surfaces. The one or more layers typically contain metal complexes of vanadium with sodium, nickel, iron, or magnesium. Slag can deposit on the surfaces of tube bundles or other heat transfer devices within the utility boiler denuding the boiler's heat transfer efficiency. Ultimately, slag deposits must be removed to restore the operational and heat exchange efficiency of the utility boiler.

One means employed in the prior art to address the aforementioned problems is to employ a slag control agent in the combustion process. Conventional slag control agents are typically magnesium compounds, such as magnesium hydroxide and magnesium oxide. The slag control agent reacts with and neutralizes sulfuric acid to form innocuous, non-corrosive compounds thereby reducing acid emissions and corrosion of process surfaces. The slag control agent also reacts or complexes with vanadium compounds, such as vanadium pentoxide and sodium orthovanadate, to render them more friable, non-corrosive and removable via conventional cleaning methods. A problem with the use of a slag control agent is that relatively large amounts may be required if the acid levels in the utility boiler are high. Such large amounts of slag control agent may cause an unacceptably high degree of slag deposition, reflectivity (reflection of the radiation component of heat) or buildup on the process surfaces of the utility boiler.

Another problem with operating utility boilers that burn fuel oil is nitrogen-based emissions. Nitrogen-based emissions ($NO_x$) result from the oxidation of trace amounts of nitrogen present in the air within the utility boiler. $NO_x$ emissions include nitrous oxide (NO) and nitrogen dioxide ($NO_2$).

Another problem with operating utility boilers that burn fuel oil is particulate emissions. Particulate emissions are made up of unburned carbon and ash. Unburned carbon is formed when burning of oil in the boiler is incomplete. Ash is inorganic particulates present in fuel oil leftover from the oil refining. The amount of unburned carbon is controllable and can be impacted by regulation of operation of the boiler. The amount of ash is not controllable since it cannot be burned.

A means employed in the prior art to address the problems of excess particulate emissions is to increase the amount of excess air in the boiler. The excess air reduces the amount of unburned carbon. A drawback to increasing the amount of excess air in the boiler is that $NO_x$ emissions are exacerbated or increased. Thus, controlling $NO_x$ emissions and particulate emissions are competing aims. Another drawback to increasing the amount of excess air is that the amount of heat lost to exhaust is increased. Thus, operational efficiency of the boiler is compromised.

It would be desirable to have a process for operating a utility boiler, wherein the boiler exhibited reduced sulfur-based, nitrogen-based, and particulate emissions. It would also be desirable to have a process for operating a utility boiler that exhibits reduced slag deposition and affords enhanced operational efficiency.

SUMMARY OF THE INVENTION

An object of the present invention is to reduce sulfur-based, nitrogen-based, and particulate emissions in the exhaust gas of a utility boiler.

Another object of the present invention is to reduce slag deposition in a utility boiler.

Still another object of the present invention is to enhance the operational efficiency of a utility boiler.

Still yet another object of the present invention is to reduce the need or frequency of cleanings of slag deposits from within a utility boiler.

According to this and other objects of the invention, there is a process for operating a utility boiler. The process has the following steps: a) continuously adding one or more slag control agents, one or more oxygen-generating agents, and a fuel oil to a furnace of the utility boiler; b) providing air to the furnace; c) burning the fuel oil to generate heat and an exhaust gas; d) periodically or continuously varying the dosage rates of the one or more slag control agents and/or the one or more oxygen-generating agents to maintain to substantially maintain one or more emissions variables in the exhaust gas within pre-determined limits.

Further according to this and other objects of the invention, there is another process for operating a utility boiler. The process has the following steps: a) continuously adding one or more slag control agents, one or more oxygen-generating agents, and a fuel oil to a furnace of the utility boiler; b) providing air to the furnace; c) burning the fuel oil to generate heat and an exhaust gas; d) periodically or continuously varying the dosage rates of the one or more slag control agents and/or the one or more oxygen-generating agents with respect to the feed rate of the fuel oil to minimize air flow rate to the furnace.

Further according to this and other objects of the invention, there is another process for operating a utility boiler. The process has the following steps: a) continuously adding one or more slag control agents, one or more oxygen-generating agents, and a fuel oil to a furnace of the utility boiler; b) providing air to the furnace; c) burning the fuel oil to generate heat and an exhaust gas; d) periodically or continuously varying the dosage rates of the one or more slag control agents and/or the one or more oxygen-generating agents with respect to the feed rate of the fuel oil to substantially maintain the rate of slag deposition on the process surfaces within the furnace within a pre-determined limit.

Further according to this and other objects of the invention, there is a method for reducing emissions from a utility boiler in which one or more slag control agents, one or more oxygen-generating agents, and a fuel oil are continuously burned to generate heat and an exhaust gas having a residual oxygen concentration. The dosage rates of the one or more slag control agents and/or the one or more oxygen-generating agents periodically or continuously varied to substantially maintain one or more emissions variables in the exhaust gas within pre-determined limits.

Further according to this and other objects of the invention, there is a method for minimizing air flow into a utility boiler in which one or more slag control agents, one or more oxygen-generating agents, and a fuel oil are continuously burned to generate heat and an exhaust gas having a residual oxygen concentration. The dosage rates of the one or more slag control agents and/or the one or more oxygen-generating agents periodically or continuously varied with respect to the feed rate of the fuel oil to minimize air flow rate to the furnace.

Further according to this and other objects of the invention, there is a method for reducing slag deposition a utility boiler in which one or more slag control agents, one or more oxygen-generating agents, and a fuel oil are continuously burned to generate heat and an exhaust gas having a residual oxygen concentration. The dosage rates of the one or more slag control agents and/or the one or more oxygen-generating agents periodically or continuously varied with respect to the feed rate of the fuel oil to substantially maintain the rate of slag deposition on the process surfaces within the furnace within a pre-determined limit.

DETAILED DESCRIPTION OF THE INVENTION

Figure 1:
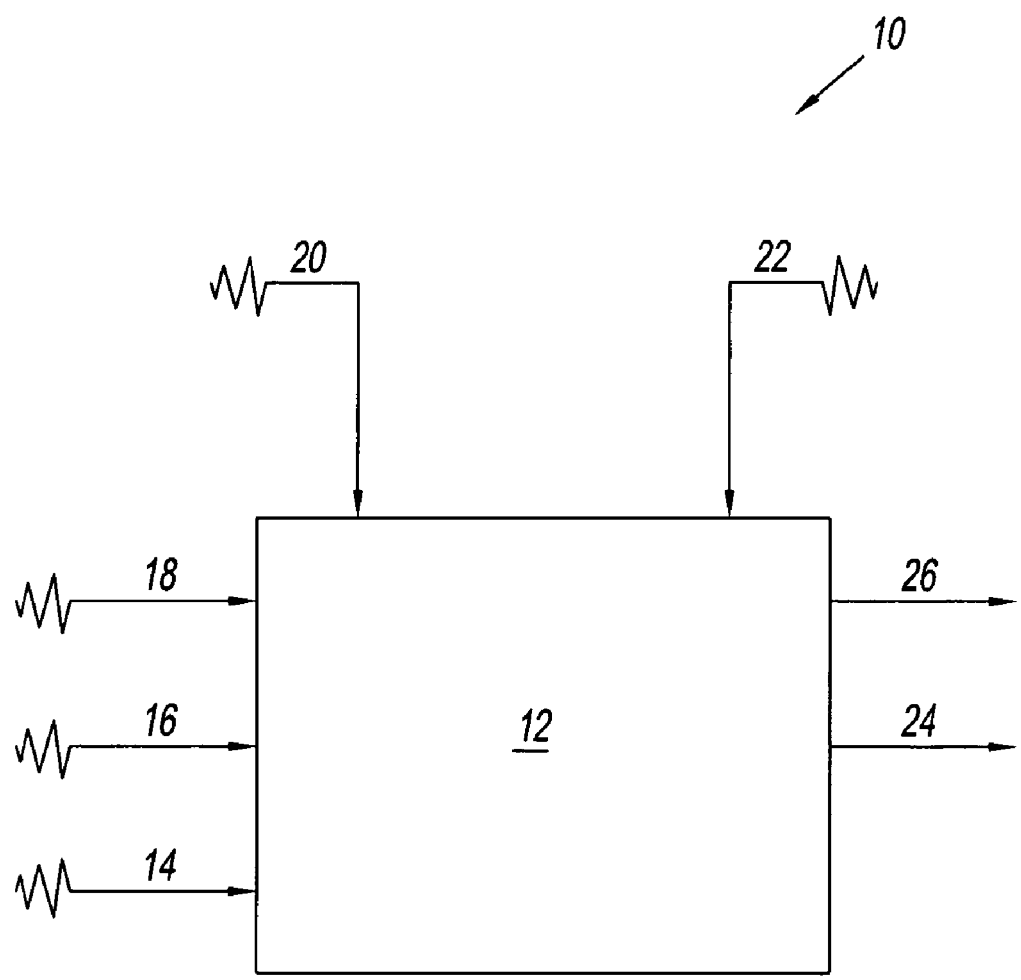
FIG. 1 is a schematic representation of a boiler system useful in carrying out the present invention.

It was surprisingly found that there could be a process for operating a utility boiler wherein the boiler exhibited reduced sulfur-based emissions, nitrogen-based, and particulate emissions. It was also surprisingly found that there could be a process for operating a utility boiler in which the boiler exhibited reduced slag deposition and afforded enhanced operational efficiency. It was further surprisingly found there could be a process for operating a utility boiler in which the need or frequency of cleanings of slag deposits from the boiler was reduced.

An important feature of the present invention the ability to optimize fuel additive dosage rates while maintaining lowering, minimizing, or optimizing the level of the amount of excess air fed to the furnace. Regulating the amount of excess air fed to the furnace affords lower heat loss from exhaust lower sulfur-based, nitrogen-based, and particulate emissions. The amount of oxygen removed is limited by opacity and particulate emissions when the oxygen-generating agent is employed.

The slag control agent is employed in the process of the present invention to prevent buildup of deposits within the furnace of the utility boiler and other process surfaces. The slag control agent reacts with sulfuric acid to form innocuous, non-acidic compounds, thereby reducing acid emissions and corrosion of process surfaces within the utility boiler. The slag control agent also reacts or complexes with any undesirable vanadium compounds that may be present in the fuel oil. Conversion of undesirable vanadium compounds, such as vanadium pentoxide and sodium vanadium pentoxide, to more innocuous vanadium compounds or forms helps to prevent or reduce catalysis of sulfur dioxide to sulfur trioxide, corrosion of process surfaces due to acid exposure, and deposition of vanadium compounds on process surfaces inside the utility boiler.

Useful slag control agents include, but are not limited to, the following: magnesium hydroxide; magnesium oxide; magnesium carbonate; and magnesium organometallic compounds, such as magnesium carboxylate, magnesium salicylate, magnesium naphthenate, and magnesium sulfonate. Preferred slag control agents are magnesium hydroxide, magnesium oxide, and organometallic magnesium carboxylate with magnesium carbonate overlay.

The oxygen-generating agent is employed in the process of the present invention to provide additional oxygen at the situs of oxidation or burning in the furnace, which allows the feed rate of air supplied to the utility boiler to be reduced and/or minimized. Use of the oxygen-generating agent also reduces the incidence of unburned carbon due to more efficient combustion or burning. Reduction of unburned carbon also reduces the incidence and retention of sulfuric acid, which is absorbed by unburned carbon.

Useful oxygen-generating agents include, but are not limited to, the following: calcium nitrate, calcium organometallic compounds, calcium salicylate, calcium sulfonate, overbased calcium carboxylate, iron oxides, iron carboxylates, iron organometallic compounds, iron sulfonates, barium oxide, barium carbonate, barium carboxylate, barium organometallic compounds, and barium sulfonate. Preferred oxygen-generating agents are the calcium compounds. Most preferred oxygen-generating agents are calcium nitrate and calcium carboxylate.

The slag control agent and the oxygen-generating agent can be added or mixed into the fuel oil prior to combustion or added into the furnace of the utility boiler during combustion or burning. The treatment of the fuel oil can be homogeneous or non-homogeneous, i.e., the agents can be homogeneously admixed within the fuel oil or non-homogeneously applied, such as to the surface or some portion of the fuel oil.

The slag control agent and the oxygen-generating agent can be used in any known product form, such as a powder or liquid. Liquids may be water-based, oil-based, or a combination thereof. Liquids may take any known liquid form, such as solutions, slurries, suspensions, dispersions, or emulsions. Liquid forms are preferred since they can be injected or sprayed with precision via conventional pumping and metering devices. A preferred means of adding the slag control agent and the oxygen-generating agent to the fuel oil is via injection in liquid form.

The amount of slag control agent employed will vary depending upon a variety of process and composition conditions, such as type of slag control agent selected, load or feed rate of fuel oil, amount and type of oxygen-generating agent used, percent of excess oxygen desired, amount or feed rate of air, impurity composition of fuel oil, and the like. When a liquid form of the slag control agent is used, the amount employed will typically vary from about 1:2000 to about 1:6000 agent:fuel oil, volume:volume.

The amount of oxygen-generating agent employed will vary depending upon a variety of process and composition conditions, such as type of oxygen-generating agent selected, load or feed rate of fuel oil, amount and type of slag control agent used, percent of excess oxygen desired, amount or feed rate of air, impurity composition of fuel oil, and the like. When a liquid form of the oxygen-generating agent is used, the amount employed will typically vary from about 1:1000 to about 1:10000 and preferably about 1:2500 to about 1:4000 agent:fuel oil, volume:volume.

The residual oxygen content of the exhaust gas exiting the boiler is preferably substantially maintained at less than 3 wt % and most preferably less than 1 wt % based on the weight of the exhaust gas during continuous, steady-state operation. Residual oxygen content of the exhaust gas relates to the amount of excess air employed in the furnace.

Fuel oil is a mixture of flammable, medium-weight hydrocarbons principally used for heating or power generation. It is alternately referred to as residual oil, #6 oil, Bunker C, heating oil, and kerosene. Fuel oil frequently contains sulfur impurities and leftover catalyst metals, such as vanadium.

The process and method of the present invention is carried out substantially continuously as the operation of a conventional utility boiler is substantially continuous.

Another advantage of the present invention is a reduction in degree of opacity of the exhaust gas upon venting to the atmosphere. Degree of opacity is controlled by reducing or minimizing sulfur trioxide content and particulate matter content. Minimizing or lowering excess air in the boiler lowers acid formation. Use of the oxygen-generating agent minimizes or lowers formation of unburned carbon, and, thus, particulate emissions.

Another advantage of the present invention is a reduction in slag deposition on process surfaces within the furnace of the utility boiler and other process surfaces in contact with the exhaust gas. Slag deposition can take the form of one or more layers caked/baked onto process surfaces. For instance, slag can deposit on the surfaces of tube bundles or other heat transfer devices within the utility boiler denuding the heat transfer efficiency of the utility boiler. Other inner layer typically takes the form of metal complexes of vanadium with sodium, nickel, or iron. The vanadium/sodium, vanadium/nickel, and vanadium/iron metal complexes exhibit relatively low melting points, i.e., 1000° F. to 1700° F. and leave a sticky deposit or buildup on process surfaces. Another layer may form on the inner layer and take the form of vanadium/magnesium complexes exhibiting slightly higher melting points than the vanadium/sodium, vanadium/nickel, or vanadium/iron complexes. The vanadium/magnesium metal complexes are water soluble and friable, and can be washed and easily removed by conventional techniques, such as soot blowing. However, if elevated amounts of slag control agent, such as magnesium oxide, are used, the slag control agent may deposit on the surfaces of the layers of the metal complexes and be difficult or impossible to remove. Magnesium oxide, a commonly used slag control agent, for example, is not water soluble or friable and is very difficult to remove by conventional techniques. In the present invention, the reduction in excess air supplied to the boiler reduces sulfuric acid formation, which reduces the amount of slag control agent required. The reduction in the amount of slag control agent reduces potential slag deposit or buildup on process surfaces.

Another advantage of the process and method of the present invention is a reduction in $NO_x$ emissions in the exhaust gas. $NO_x$ emissions include nitrous oxide (NO) and nitrogen dioxide ($NO_2$). As for sulfur-based emissions, the reduction in excess air in the furnace results in less $NO_x$ emissions based on less mass air flow through the furnace. The less air there is, the less that can be catalyzed to $NO_x$ compounds.

In another aspect of the invention, it is advantageous to operate a utility boiler by regulating the dosage rate of the slag control agent and the oxygen-generating agent based on the feed rate of the fuel oil. It was surprisingly found that the dosage rate of the slag control agent could be reduced or eliminated entirely as fuel oil feed rates increase if an oxygen-generating agent is employed. At relatively low fuel oil feed rates relative to the capacity of the utility boiler (low load), emissions quality (low residual oxygen content) can usually be controlled with a high degree of success with a slag control agent alone. However, as boiler load increase to medium to high levels relative to the capacity of the utility boiler, the slag control agent may become less effective, and, ultimately, ineffective in maintaining emissions quality. Use of an oxygen-generating agent is necessary to maintain emissions quality at medium to high boiler loads. As medium to high boiler loads are reached, use of the oxygen-generating agent can either be initiated or increased over initial or previously lower levels. As the use of the oxygen-generating agent is either initiated or increased, the use of the slag control agent can be reduced or eliminated entirely. The dosage rate of oxygen-generating agent can be increased one or more times as the feed rate of fuel oil is increased. It is desirable to minimize the use of slag control agent to minimize slag deposition on process surfaces.

The dosage rates of the oxygen-generating agent and the slag control agent and the feed rate of air to the boiler can be regulated or adjusted at least periodically/intermittently or continuously by any means known in the art. Sensors and/or flow meters can monitor process variables, such as fuel oil feed rates, opacity level, acid level and/or particulate count. Fuel oil feed rate and particulate count are preferred variables for tracking purposes. Levels indicated by the sensors and/or flow meters determine the dosage rates of the agents. Levels for process variables can be monitored so that they do not exceed a pre-determined value or limit or can be at set-points.

The FIGURE shows a boiler system 10. System 10 has a boiler 12. Feed streams 14, 16, 18, 20, and 22 feed fuel oil, a slag control agent, an oxygen generating agent, water, and air, respectively, into boiler 12. Exit stream 24 delivers steam produced in boiler 12. Exit stream 26 delivers exhaust gas and waste heat.

The following are examples of the invention. All parts, percentages, and ratios are by weight unless indicated otherwise.

EXAMPLES

Example 1

The process of the present invention was carried out in a electric power generation facility on a utility boiler burning fuel oil. Measurements for opacity, excess oxygen, sulfur trioxide, metals temperature, and total acid content were taken at steady state. The first run was a comparative example that employed a slag control agent. The second run was an example that employed both a slag control agent and an oxygen-generating agent and an excess oxygen content of less than 3 wt % in the exhaust gas. Results are set forth in Table 1.

TABLE 1

| Run | Additive | MW | Opacity (Avg %) | Excess $O_2$ (Avg %) | $SO_3$ at AHI (ppm) | $SO_3$ at AHO port 2 (ppm) | Avg metals temp (° F.) | Total Acid (μgm/ $cm^2$/hr) |
|---|---|---|---|---|---|---|---|---|
| 1* | SFT-1180 | 347 | 10.3 | 1.5 | 5.6 | 4.3 | 197 | 217.4 |
| 2 | SFT-1180 and CC-910 | 410 | 11.3 | 0.9 | 3.5 | 3.2 | 218 | 141.6 |

*not an example of the present invention

SFT-1180 = magnesium carbonate/magnesium carboxylate in kerosene by Environmental Energy Systems CC-910 = calcium nitrate by Environmental Energy Systems MW = megawatts power generated AHI = air heater inlet AHO = air heater outlet Avg. = average ppm = parts per million Example 2

The process of the present invention was carried out in a electric power generation facility on a utility boiler burning fuel oil. Measurements for opacity, excess oxygen, and particulates were taken at steady state.

Measurements were taken at five different points in time during continuous operation. The results were compared with an initial test (Baseline Test) prior to addition of the oxygen agent and a terminal test after the addition of the oxygen agent had been terminated (Baseline Test Stopped). The addition of the oxygen agent had been terminated approximately one hour prior to the terminal test but some residual oxygen agent remained. Gross Load (MWg) was kept constant throughout the test at 613 megawatts (MW).

The oxygen agent used was Opacitrol-M by EES Corp. Opacitrol-M had calcium nitrate at 66% by weight active. The slag control agent used was MH-502 by EES Corp. MH-502 had 53% by weight magnesium hydroxide. The results are set forth in the Table 2 below.

TABLE 2

| Comments: | | Baseline Test *** | CombCat Low Inj. (Started @ 10:45) | CombCat Mid Inj. (Adjusted @ 11:05) | CombCat Mid Inj. (Reduce Air@ 13:50) | CombCat High Inj (Adjusted @ 15:10) @ Low $O_2$ | CombCat High Inj (Adjusted @ 15:50) @ Normal $O_2$ | Baseline Test (CombCat Stopped @ 17:25) *** |
|---|---|---|---|---|---|---|---|---|
| Gross Load | MWg | 612.6 | 612.5 | 612.8 | 612.8 | 613.0 | 612.7 | 612.7 |
| Fuel Oil | | | | | | | | |
| Flow Net | KLb/H | 302.2 | 300.9 | 301.0 | 304.1 | 308.5 | 302.1 | 301.9 |
| Excess Oxygen | | | | | | | | |
| ID Fan $O_2$ Avg | % | 2.70 | 3.12 | 3.09 | 2.08 | 1.38 | 2.98 | 2.95 |
| Fuel Additive Ratio | | | | | | | | |
| Slag Red Agent Flow | gph | 4.0 | 4.0 | 4.0 | 4.0 | 4.0 | 4.0 | 4.0 |
| Slag Red Agent Ratio | gFA/gOil | 9317 | 9276 | 9279 | 9375 | 9509 | 9312 | 9306 |
| Oxygen Agent Flow | gph | 0.0 | 12.5 | 18.5 | 18.5 | 37.0 | 37.0 | 0.0 |
| Oxygen Agent Ratio | gFA/gOil | Basis | 2968 | 2006 | 2027 | 1028 | 1007 | Basis |
| CEM Emissions | | | | | | | | |
| Stack Opacity (Instan) | % | 12.6 | 8.3 | 6.4 | 12.8 | 13.3 | 9.4 | 9.7 |
| Stack Opacity (CEMS) | % | 13.1 | 8.2 | 6.4 | 12.4 | 14.3 | 9.4 | 9.5 |
| Stack Opacity 6-Min Avg | % | 12.6 | 8.4 | 6.4 | 13.0 | 13.3 | 9.4 | 9.7 |
| Opacity Red. (ESP Inlet Basis) | % | Basis | 36.6 | 43.6 | −2.9 | 6.4 | 64.6 | Basis |
| NO*x* | ppm | 139 | 144 | 144 | 131 | 124 | 143 | 145 |
| | Lb/MBtu | 0.190 | 0.201 | 0.200 | 0.180 | 0.169 | 0.200 | 0.203 |
| NO*x* Reduction | % | — | −5.8 | −5.5 | 5.1 | 10.7 | −5.3 | — |
| APH Inlet Emissions | | | | | | | | |
| Particulates | Lb/MBtu | 0.058 | 0.036 | 0.032 | 0.043 | 0.035 | 0.036 | 0.039 |
| Particulate Reduction | % | Basis | 37.9 | 44.8 | 25.9 | 39.7 | 37.9 | 32.8 |

*** - Baseline Test and Baseline Test Stopped are not examples of the present invention Klb/H—thousands of pounds per hour ID Fan $O_2$ Avg - induced draft fan, oxygen average in exhaust gas CEM Emissions—continuous emissions monitoring 6-Min Avg—six minute average ESP Inlet Basis - opacity sensor at inlet to the electrostatic precipitator gph—gallons per hour gFA/gOIL—gallons of fuel additive per gallon of fuel oil CombCat - designation indicating use of oxygen agent The results show that excess oxygen started at 3.12% and was lowered to 1.38%, at which maximum $NO_x$ reduction was achieved. This was achieved by using the oxygen generating agent.

A maximum $NO_x$ reduction was of 10.7% was achieved.

The slag reducing agent was kept at a dosage of 1:9000 (w/w fuel oil), which is extremely low compared to conventional dosages. This was possible because of the synergistic effect created by the oxygen generating agent and the slag reducing agent.

Particulate reductions of 40% were achieved even under reduced excess air conditions. This is a result of the slag reducing agent working with the oxygen reducing agent.

It should be understood that the foregoing description is only illustrative of the present invention. Various alternatives and modifications can be devised by those skilled in the art without departing from the invention. Accordingly, the present invention is intended to embrace all such alternatives, modifications and variances that fall within the scope of the appended claims.

What is claimed is:

1. A process for operating a utility boiler, comprising:

a) adding a fuel oil to a furnace of the utility boiler at an initial feed rate;

b) adding one or more slag control agents to the furnace at an initial dosage rate based upon the initial feed rate of the fuel oil;

c) optionally adding one or more oxygen-generating agents to the furnace at an initial dosage rate based upon the initial feed rate of the fuel oil;

d) providing air to the furnace;

e) burning the fuel oil to generate heat;

f) increasing the initial feed rate of the fuel oil to an increased feed rate;

g) reducing the initial dosage rate of the one or more slag control agents based upon the increased feed rate of the fuel oil;

h) adding one or more oxygen-generating agents if one or more oxygen-generating agents were not previously added in step (c), wherein the dosage rate of the one or more oxygen-generating agents is based upon the increased feed rate of the fuel oil, or, if one or more oxygen-generating agents were previously optionally added, increasing the dosage rate of the one or more oxygen-generating agents relative to the initial rate in step (c) based upon the increased feed rate of the fuel oil;

i) continue providing air to the furnace; and j) continue burning the fuel oil to generate heat, wherein the slag control agent is selected from the group consisting of magnesium hydroxide, magnesium oxide, magnesium carbonate, magnesium organometallic compounds, magnesium carboxylate, magnesium salicylate, magnesium napthenate, and magnesium sulfonate.

2. The process of claim 1, wherein the one or more oxygen-generating agents is selected from the group consisting of calcium hydroxide, calcium oxide, calcium carbonate, calcium carboxylate, calcium nitrate, calcium organometallic compounds, calcium sulfonate, iron hydroxides, iron oxides, iron carbonates, iron carboxylates, iron organometallic compounds, iron sulfonates, barium hydroxide, barium oxide, barium carbonate, barium carboxylate, barium organometallic compounds, and barium sulfonate.

3. The process of claim 1, wherein the one or more slag control agents and the one or more oxygen-generating agents are added to the fuel oil.

4. The process of claim 1, wherein the one or more oxygen-generating agents was not previously added.

5. The process of claim 4, wherein the one or more oxygen-generating agents is selected from the group consisting of calcium nitrate and calcium organometallic compounds.

6. The process of claim 1, wherein the one or more oxygen-generating agents is selected from the group consisting of calcium nitrate and calcium organometallic compounds.

7. The process of claim 6, wherein the one or more oxygen-generating agents is calcium nitrate.

8. The process of claim 1, wherein the slag control agent is magnesium hydroxide.

9. A process for operating a utility boiler, comprising:

(a) continuously burning one or more slag control agents, one or more oxygen-generating agents, and a fuel oil in an excess of air in a furnace of the boiler to generate heat and an exhaust gas, wherein the one or more slag control agents and the one or more oxygen-generating agents are different compounds;

(b) varying the dosage rates of the one or more slag control agents and/or the one or more oxygen-generating agents with respect to the feed rate of the fuel oil; and (c) maintaining the level of air in the furnace such that the excess air content in the exhaust gas is lower than required for complete burning of the fuel oil without the one or more oxygen-generating agents, wherein the dosage rate of the one or more slag control agents is reduced or eliminated as the dosage rate of the one or more oxygen-generating agents is increased.

10. The process of claim 9, wherein the level of air in the furnace is maintained such that the level of residual oxygen content in the exhaust gas is less than 3 wt % based on the weight of the exhaust gas.

11. The process of claim 9, wherein the level of air in the furnace is maintained such that the level of residual oxygen content in the exhaust gas is less than 1 wt % based on the weight of the exhaust gas.

12. The process of claim 9, wherein the dosage rate of the one or more oxygen-generating agents is increased when the feed rate of the fuel oil is increased.

13. The process of claim 9, wherein the slag control agent is selected from the group consisting of magnesium hydroxide, magnesium oxide, magnesium carbonate, magnesium organometallic compounds, magnesium carboxylate, magnesium salicylate, magnesium napthenate, and magnesium sulfonate.

14. The process of claim 9, wherein the one or more oxygen-generating agents is selected from the group consisting of calcium hydroxide, calcium oxide, calcium carbonate, calcium carboxylate, calcium nitrate, calcium organometallic compounds, calcium sulfonate, iron hydroxides, iron oxides, iron carbonates, iron carboxylates, iron organometallic compounds, iron sulfonates, barium hydroxide, barium oxide, barium carbonate, barium carboxylate, barium organometallic compounds, and barium sulfonate.

15. The process of claim 9, wherein the slag control agent is magnesium hydroxide, wherein the one or more oxygen-generating agents is selected from the group consisting of calcium nitrate and calcium organometallic compounds.

* * * * *